US006163736A

United States Patent [19]

Halfacre

[11] Patent Number: 6,163,736

[45] Date of Patent: Dec. 19, 2000

[54] TAMPER RESISTANT PROGRAMMABLE MEDICINE DISPENSER

[76] Inventor: Van Halfacre, 307 N. Davis St., Manila, Ark. 72442

[21] Appl. No.: 09/100,465

[22] Filed: Jun. 19, 1998

[51] Int. Cl.[7] .................... G06F 17/00

[52] U.S. Cl. .................... 700/232; 700/231; 700/236; 700/242; 700/243; 221/4; 221/8; 221/15; 221/17; 221/83; 221/86; 221/89; 221/102; 221/119; 221/185; 221/247; 221/258

[58] Field of Search .................... 700/232, 242, 700/243, 236, 231; 221/8, 4, 5, 17, 15, 18, 19, 89, 82, 86, 185, 258, 119, 247, 248, 83, 102

[56] References Cited

U.S. PATENT DOCUMENTS

| | | | |
|---|---|---|---|
| 4,207,992 | 6/1980 | Brown . | |
| 4,310,103 | 1/1982 | Reilley, Jr. et al. . | |
| 4,838,453 | 6/1989 | Luckstead | 221/2 |
| 4,911,327 | 3/1990 | Shepherd et al. . | |
| 5,097,982 | 3/1992 | Kedem et al. | 221/3 |
| 5,176,285 | 1/1993 | Shaw . | |
| 5,323,929 | 6/1994 | Marlar . | |
| 5,397,017 | 3/1995 | Muza et al. | 221/91 |
| 5,412,372 | 5/1995 | Parkhurst et al. . | |
| 5,438,523 | 8/1995 | Humm et al. | 364/479.13 |
| 5,441,165 | 8/1995 | Kemp et al. | 221/2 |
| 5,609,268 | 3/1997 | Shaw . | |

*Primary Examiner*—H. Grant Skaggs
*Assistant Examiner*—Jeffrey A. Shapiro
*Attorney, Agent, or Firm*—Dowell & Dowell, P.C.

[57] ABSTRACT

A portable electrically operable and tamper resistant medication dispenser for supplying multiple daily medications to a patient on a predetermined schedule and which includes a programmable assembly for indexing a plurality of containers which are filled with the medications to a dispenser outlet.

19 Claims, 4 Drawing Sheets

TAMPER RESISTANT PROGRAMMABLE MEDICINE DISPENSER

BACKGROUND OF THE INVENTION

1. Field of the Invention

This invention is generally directed to automated medication dispensers which are programmable to make medication available to patients on a predetermined schedule over an extended period of time and, more specifically, to such dispensers which include a plurality of containers containing medicine to be taken and which containers are carried by an indexing assembly so as to be moved relative to a dispenser outlet on a predetermined schedule. The invention is further directed to dispensers which are portable and electrically operated and which may include a battery backup system for insuring fail-safe operation during a loss of conventional power. The dispensers further include tamper-resistant mechanisms for preventing unauthorized movement of the indexing assembler to prevent untimely access to medications.

2. History of the Related Art

There are many patients who must take one or more medications over a period of time. Frequently, patients will require multiple dosages of different medicines in a single day with the medications being required at predetermined time intervals. To be effective, many medications must be taken at predetermined times over a period of days, weeks or longer. Therefore, it is extremely important to the health and welfare of patients that they follow their medication schedule to insure the optimum benefit to be obtained from their medication.

In clinics and hospitals, doctors and nurses maintain timing schedules for patients and must take steps to insure that each patient receives the proper medication at the proper times. Such a labor intensive system for insuring that patients take their required medication at the proper time greatly affects the cost of providing medical care. There are, of course, circumstances wherein patients may not be capable of taking medication at proper times and thus require direct assistance. However, there are many instances, both in clinic and hospital environments as well as where patients are receiving medication on an out-treatment basis, where patients have the physical ability to take a medication if they are aware that a medicinal dosage is required at a specific time.

Over the years, there have been many dispensers designed to facilitate the proper administration of medicine to patients who require that medications be taken at specific times over a prolonged period. Basic dispensers included containers having a plurality of separate receptacles for receiving predetermined medications. For example, a container may include seven receptacles each representing a day of the week. Medication is placed within the receptacles with each receptacle being marked with a day of the week. The patient is directed to take the prescribed medicine from the proper receptacle on a predetermined schedule.

Such prior art mechanical dispensers which require that the patient take medications on a prescribed basis have not proven to be satisfactory. Often, patients forget to take their medication or to take their medication in a timely manner. Such failure to take medication when due not only results in the ineffective administration of the medication, but frequently patients will attempt to make up for missed dosages by taking several dosages at a later time which can be hazardous to the patient's health.

To prevent patients from taking missed dosages at a later time, some prior art dispensers have been designed to incorporate motors or drive mechanisms for indexing a receptacle or compartments in which medications are contained away from a dispensing outlet. Such dispensers are operable to move a compartment in alignment with a dispensing outlet only at a predetermined time. If a medication has not been removed from the dispenser within a predetermined time, the medication is moved from the dispensing outlet. Unfortunately, many prior art dispensers can be easily tampered with, thereby allowing a patient to obtain access to medicines which should not be taken.

To alert patients that medication is required, some prior art dispensers have been designed to incorporate audible or visual signal devices for indicating a time for a medicine to be taken. For instance, such dispensers may incorporate a buzzer which sounds for a period of time to alert a patient that medication is required. Such signaling devices are more effective in assuring that a patient follows a predetermined medication schedule, however such devices do not prevent a patient from doubling up on dosages which have been missed for one reason or another.

Some examples of prior art medication dispensers which provide for alarms or signals and which are designed for dispensing medication over a period of time and which also include programmable timers include U.S. Pat. No. 4,207,992 to Brown, U.S. Pat. No. 4,911,327 to Shepherd et. al., U.S. Pat. No. 5,176,285 to Shaw, U.S. Pat. No. 5,323,929 to Marlar, U.S. Pat. No. 5,412,372 to Parkhurst et. al., and U.S. Pat. No. 5,609,268 to Shaw.

SUMMARY OF THE INVENTION

The present invention is directed to a portable and tamper resistant electronically operated medication dispenser which incorporates a programmable timer and drive assembly for selectively indexing a plurality of separate containers relative to a dispenser outlet. In the preferred embodiment, the present invention includes a portable carrying case which may be locked to prevent access to the interior. Within the carrying case is a ratchet wheel having a plurality of spaced openings or pockets, each being of a size to selectively receive a container. The containers are configured to receive required dosages of medicine dosages which a patient must take and which are normally filled by competent medical technicians such as physicians or nurses. The indexing wheel is designed to permit controlled dispensing of medications over a period of a week with a separate section of the wheel being available to contain additional medication for an additional day in the event of an emergency. Further, in the preferred embodiment, a plurality of pockets are provided for each day so that containers of medication may be indexed in a timely manner at up to six or more intervals during a given day. Utilizing the controller associated with the invention, the indexing wheel can be selectively moved so that doses of medicine are supplied at varied intervals for each day of the week the dispenser is in use.

The movement of the ratchet wheel of the present invention is accomplished by a motor connected to a linear actuator which carries a spring-loaded pawl engageable with teeth of the ratchet wheel. The linear actuator is moveable between a pair of spaced electrical switches which control an oscillating movement thereof such that the pawl is engageable to move the wheel one position for each stroke of the linear actuator. Mounted within the dispenser adjacent to the dispenser opening is a first switch which is engageable by a container which is being indexed into alignment with the dispenser outlet. The switch is electrically connected to sound an audible alarm until such time as the indexing assembly moves the container into alignment with the dispenser opening at which time the switch is allowed to open thereby terminating the audible alarm. In some embodiments, a delay may be converted to the switch to cause the alarm to sound for a predetermined period. A second switch adjacent the dispenser outlet is engageable with a container which is seated in a position of alignment with the dispenser outlet which switch activates a visual signal such as a light source. Upon removal of the container by the patient, the second light switch is opened and the light deactivated. Therefore, with the present invention, a visual indication that medication is required remains as long as a medication container is aligned with the dispenser outlet.

The invention further incorporate a brake mechanism which restricts movement of the ratchet wheel such that a patient cannot move the ratchet wheel and obtain access to medication with exception to those medications which are contained within a container aligned with the dispenser outlet opening. Further, the pawl associated with the linear actuator prevents any reverse rotation of the ratchet wheel by a patient or other individual.

The present invention further may incorporate a battery backup which will permit operation of the linear actuator in the event of a power failure to a normal AC power source.

The carrying case is also designed to store containers which have been used and includes an opening through which containers may be inserted by the patient so that the containers may be recycled to facilitate economy.

It is a primary object of the present invention to provide a portable electrically operated medication dispenser which prevents unauthorized access to medication after being placed in the dispenser and which incorporates a mechanism for resisting tampering with the normal operation of the dispenser such that medication cannot be obtained by the patient or other individual until the medication is aligned with a dispenser outlet opening at a predetermined time.

It is also an object of the present invention to provide a medication dispenser which is portable and which is designed to allow its use with a conventional source of electrical power such as an AC power source but which is also capable of functioning in the event of loss of AC power by power from a battery backup system.

It is yet another object of the present invention to provide a medication dispenser which permits the controlled dispensing of a plurality of different medications, such as tablets and capsules and the like which must be taken by a patient at different periods of a day, which can be used for a period in excess of a week under normal circumstances.

It is a further object of the present invention to provide a portable medication dispenser which includes a programmable controller for allowing medication to be dispensed at any given time over a period of a week or more such that dosages may be provided to a patient on a predetermined schedule.

It is also an object of the present invention to provide a medication dispenser which includes a plurality of sterilized containers for receiving different medications and which containers are appropriately retained in a dispensing mechanism in such a manner that the medication is made available to a patient on a predetermined schedule by entry of a sequenced timing program into a programmable timer or controller.

It is yet another object of the present invention to provide a medication dispenser which utilizes separate sterilized containers to retain different medications which must be administered to a patient in a predetermined time sequence wherein the containers may be stored, after use, within the dispenser to thereby facilitate recycling of containers for future use.

BRIEF DESCRIPTION OF THE DRAWINGS

The invention will be better understood with reference to the attached drawing figures wherein.

DESCRIPTION OF THE PREFERRED EMBODIMENT

Figure 3:
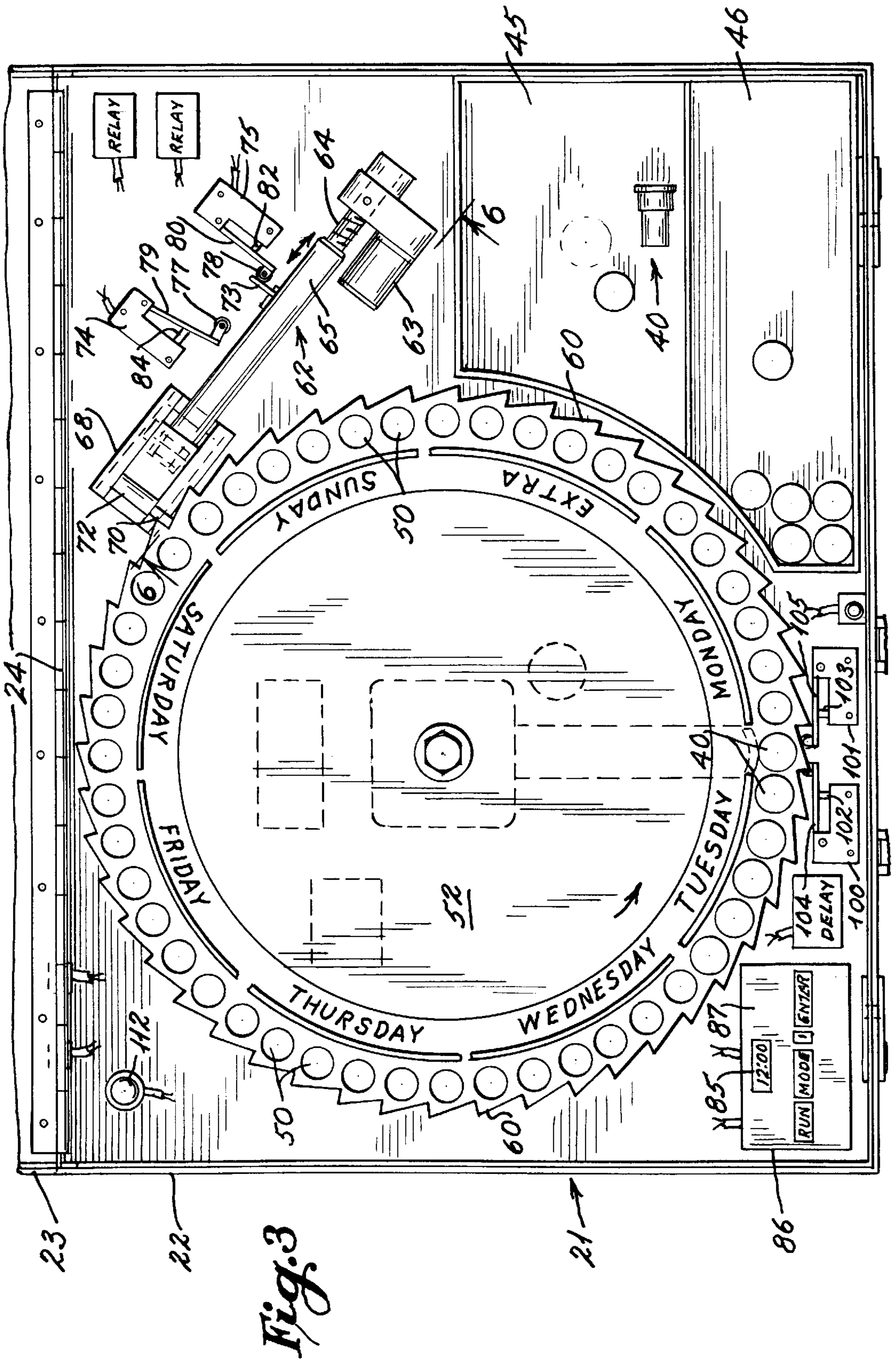
FIG. 3 is a top plan view of the dispenser of the present invention shown with the lid in FIG. 1 being fully open.

With continued reference to the drawing of figures, the medication dispenser 20 includes a portable carrying case 21 having a lower section 22 and a lid 23 which is pivoted to the lower portion by way of a hinge assembly 24 (see FIG. 3.). The carrying case 21 includes a pair of carrying handles 25 and 26 which are mounted on the front wall 27 and rear wall 28 thereof. In some embodiments, a single carrying handle may be associated with the carrying case. To prevent unauthorized access to medication which is contained within -the dispenser, a pair of latches 29 and 30 are mounted along the front wall 27. Each latch includes a key lock such as shown at 31 and 32.

Figure 1:
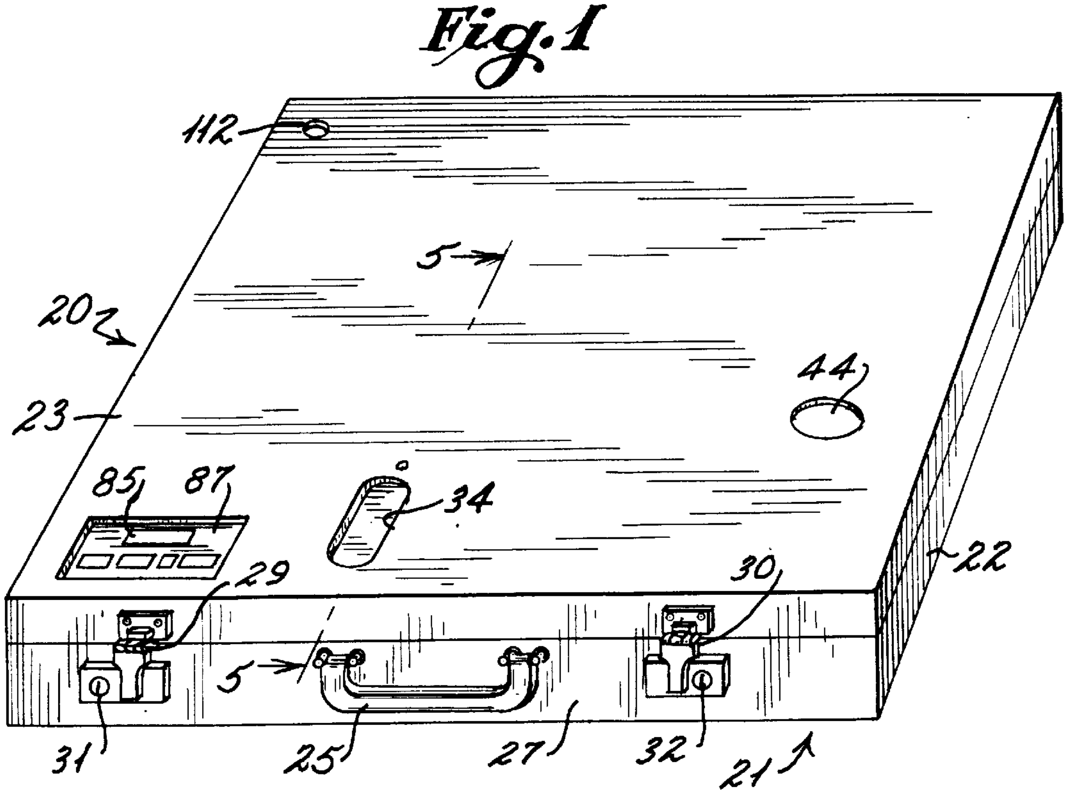
FIG. 1 is a front perspective view of the portable medication dispenser of the present invention showing the lid of the dispenser closed and locked to prevent unauthorized access to medication therein.
Figure 2:
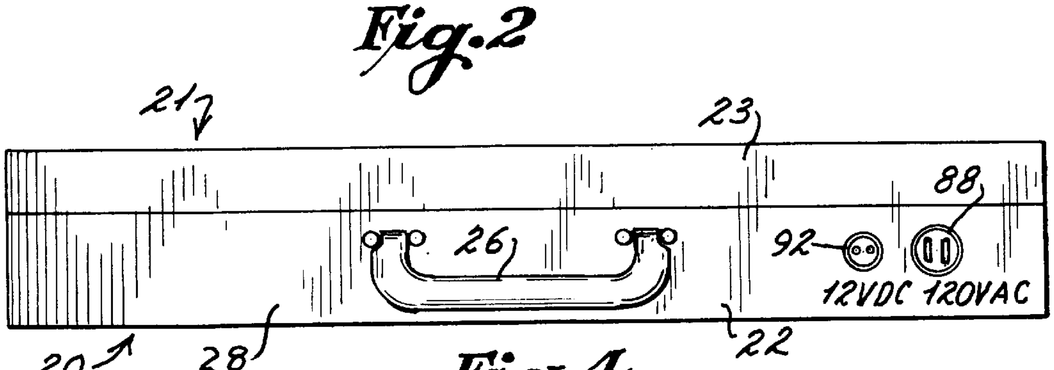
FIG. 2 is a rear plan view of the dispenser shown in FIG. 1.
Figure 8:
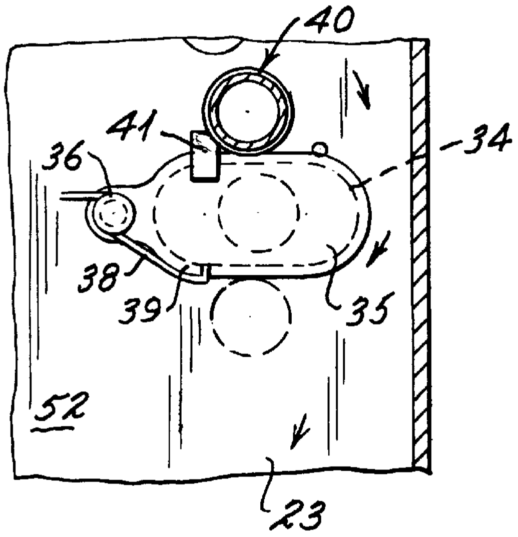
FIG. 8 is a cross-sectional view taken along line 8—8 of FIG. 5.
Figure 9:
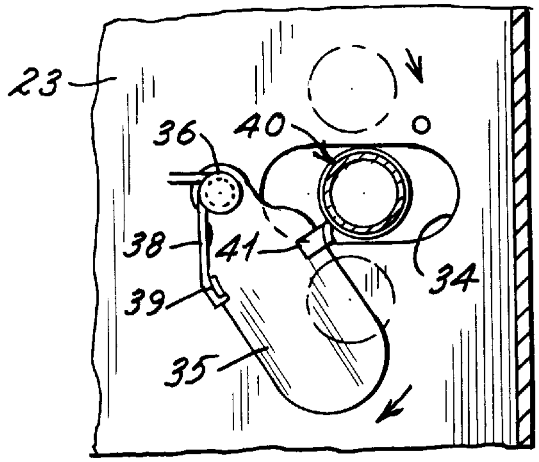
FIG. 9 is a view similar to FIG. 8 showing a cover for the dispenser outlet opening being moved to an open position.

As shown in FIG. 1, a dispenser outlet opening 34 is provided through the lid and is normally covered by a pivotable cover 35 (see FIGS. 8 and 9) which is mounted about a pivot pin 36. A spring 38 is mounted about the pivot pin 36 and is engageable with a tab 39 on the cover 35 so as to normally urge the cover to a position to close the dispenser outlet opening 34, as is shown in FIG. 8. However, the cover 35 is designed to be automatically pivoted to an open position as shown in FIG. 9 as a medicine container 40 is indexed to a position of alignment with the dispenser outlet opening 34, as will be described in greater detail. To facilitate the pivoting movement of the cover 35, a depending tab 41 is connected thereto which is engageable by a container. As the container moves in the direction of the arrows shown in FIG. 8 the cover will be pivoted to an open position relative to the dispenser outlet opening 34. Once the container 40 is removed through the opening by the patient, the cover will be free to pivot to the closed position of FIG. 8 under the influence of the spring 38.

Figure 10:
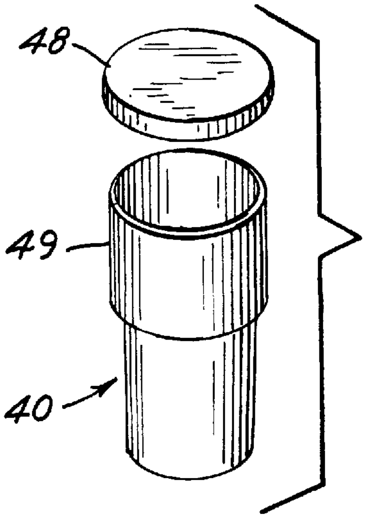
FIG. 10 is perspective assembly view of one of the containers utilized with the dispenser of the present invention.

Also shown in FIG. 1 is an opening 44 in the lid which aligns with a collection tray 45 formed within the lower portion 22 of the carrying case 21, as shown in FIG. 3. The collection tray is utilized to retain medication containers 40 after the medication has been taken by the patient thus allowing for recycling of the containers. Also shown in FIG. 3 is a second storage receptacle 46 in which containers of medicine may be retained for selective use when filling the containers 40 of the present invention or such containers may be additional containers 40 which will be used in accordance with the teachings of the present invention. With specific reference to FIG. 10, each of the medicinal dosage containers 40 includes a lid 48 for sealing the container prior to the medication being removed therefrom by a patient and an annular flange 49.

Figure 4:
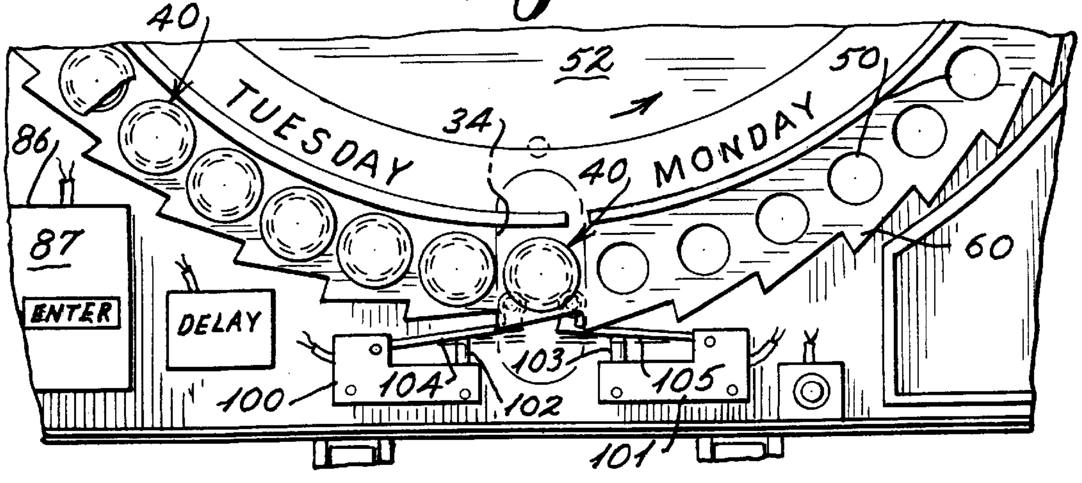
FIG. 4 is an enlarged partial top plan view showing the switches for creating audible and visual signals to indicate the presence of a medication container at the outlet opening of the dispenser.
Figure 5:
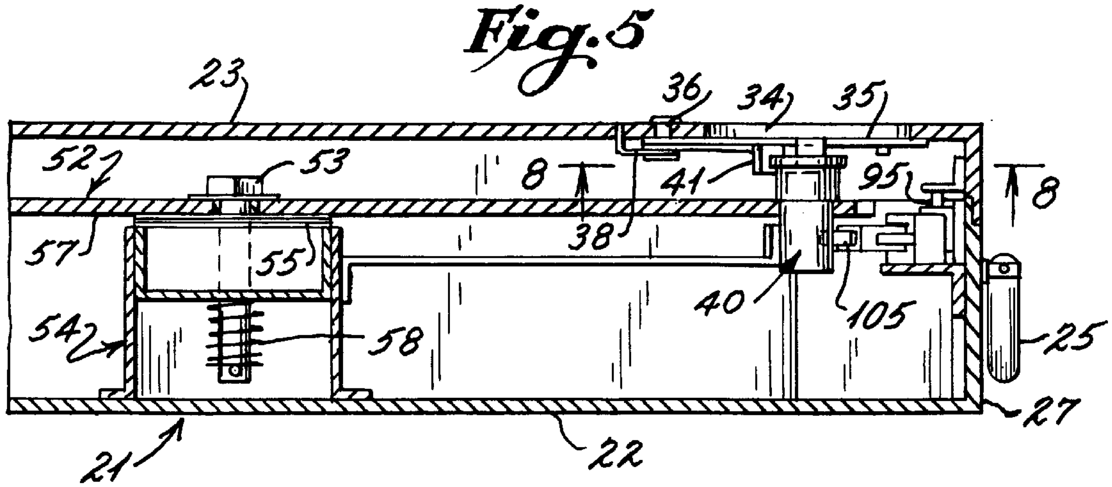
FIG. 5 is a partial cross-sectional view taken along line 5—5 of FIG. 1.
Figure 6:
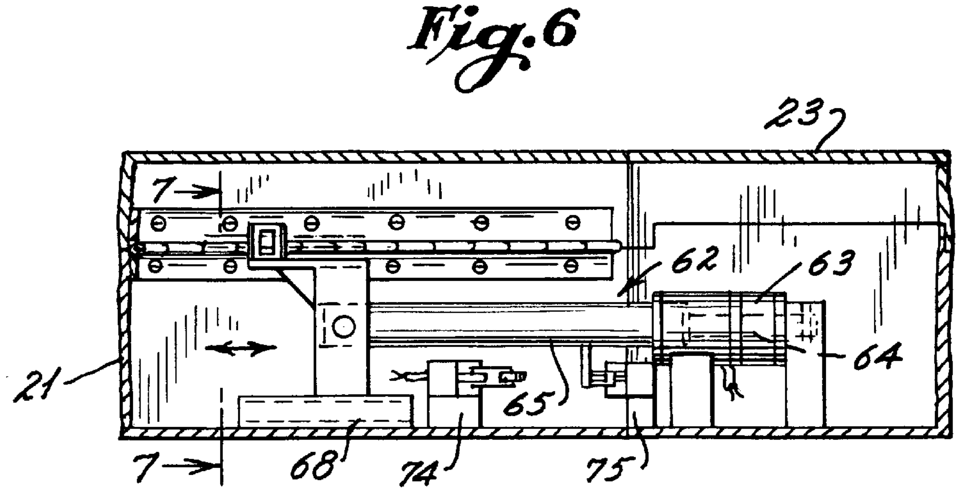
FIG. 6 is a cross-sectional view taken along line 6—6 of FIG. 3.
Figure 7:
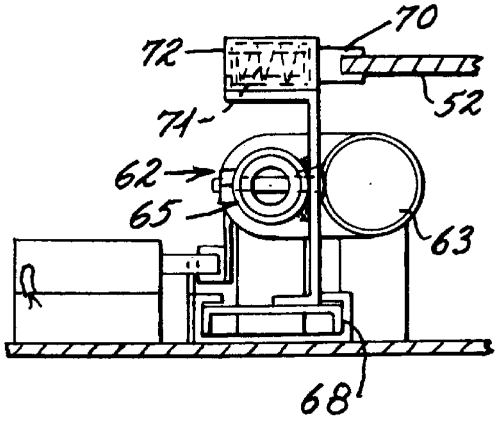
FIG. 7 is cross-sectional view taken along line 7—7 of FIG. 6.

With particular reference to FIGS. 3–5, the medication containers 40 are designed to be retained within a plurality of openings or pockets 50 formed in a ratchet wheel 52 with their flanges 49 supported on the wheel. The wheel 52 is mounted to rotate about a central pivot pin or bolt 53. To prevent unauthorized movement of the wheel 52, a brake mechanism 54 is provided which includes bolt 53 and which places a frictional force between the bolt head 53 and the lower surface 57 of the wheel, as shown in FIG. 5. The brake 54 includes an upper bearing member 55 having an upper surface which supports the lower surface of the wheel 52. A spring 58 normally urges the bearing member to thereby bend the wheel there between. The brake provides at least twelve pounds of friction pressure to prevent manual manipulation of the wheel 52 relative to the dispenser opening 34.

As shown in FIG. 3, in the preferred embodiment, 48 openings or pockets 50 are provided in the wheel adjacent the outer periphery thereof. The embodiment disclosed is by way of example and the number of openings or pockets may vary and yet remain within the teachings of the present invention.

The number of openings is designed to allow up to at least six dosages to be made available in a pre-scheduled manner to a patient for each day of the week. Therefore, in the embodiment shown, there are six openings associated with each day. Further, the invention provides an additional six openings for retaining extra containers as a source of emergency medication in the event a medical technician cannot properly refill the dosage containers 40 and place them in the appropriate openings 50 of the rachet wheel 52.

The outer peripheral edge of the wheel 52 is provided with a plurality of ratchet teeth 60 equal in number to the number of container pockets or openings 50. In this manner, indexing of the wheel 52 in increments aligns one of the openings 50 with the dispenser opening 34.

The rotational movement of the wheel 52 is accomplished by a linear actuator assembly 62. The actuator assembly includes a drive motor 63 which is connected to a driven lead screw 64. The motor 63 is of the reversible type such that the lead screw may be driven in opposite directions so as to move an outer actuator cylinder 65 both inwardly and outwardly relative to the lead screw 64, as is shown by the arrow in FIG. 3. The outer end of the cylinder 65 is guided within a slide assembly 68 so as to insure proper orientation of the cylinder 65 when being driven in each direction by way of the lead screw 64. The outer end of the actuator cylinder 65 is connected to a pawl 70 which is mounted within a housing 72 and which is resiliently urged outward of the housing by a spring (not shown). The pawl 70 is engageable with each of the ratchet teeth, as is shown in FIG. 3. In the operation of the linear actuator assembly 62, when the motor is activated to drive the wheel in a counterclockwise direction, as shown in FIG. 3, the actuator cylinder 65 will move outwardly relative to the lead screw 64 with the pawl 70 pushing an adjacent ratchet tooth 60 to thereby rotate the wheel against the force of the friction brake assembly 54. The actuator is designed to provide sufficient linear drive to rotate the wheel through one 1/48th of its circumference so as to align the next pocket 50 with the dispenser outlet opening 34.

To control the movement of the linear actuator, a pair of cam switches 74 and 75 are mounted adjacent the linear actuator cylinder 65. A flange 73 is fixedly mounted to the actuator cylinder 65 and extends outwardly thereof so as to be engageable with the outer ends 77 and 78 of pivot actuator arms 79 and 80 associated with the switches 74 and 75. In the position shown at FIG. 3, actuator arm 80 has been engaged by the flange 73 thereby closing switch contact 82 to terminate power to the motor 63. When the motor is again activated the lead screw will be rotated thus driving the actuator cylinder 65 until the flange 73 engages the arm 79 of the switch 74. When the flange 73 engages the outer end 77 of the switch arm 79, the arm will close switch contact 84 thus stopping the motor 63 and placing it in a reverse drive such that the linear actuator cylinder 65 is moved toward the switch 75. During this movement, the pawl 70 will ride over the inclined outer edge of the adjacent tooth until engaging behind the outer portion of the tooth as shown in FIG. 3 thereby preventing rotation of the ratchet wheel in a clockwise direction as shown in the drawing figures. The pawl is retained in seated engagement against the outwardly extending face of the tooth by way of the spring 71 which urges the pawl outwardly from the housing 72.

A programmable controller 86 is provided within the dispenser and includes a surface panel 87 as shown in FIG. 1 having appropriated inputs and time display 85 associated therewith which allows a technician to program the operation of the linear actuator to move the ratchet wheel at specific times of a day so that dosages of medication are made available to the patient. It should be noted that, in some instances, the controller will cause the linear actuator to move the ratchet wheel in a number of consecutive increments especially when medication is only contained within a single container for each day. In such instances, the actuator will be operated to cycle through six movements of the ratchet wheel to consecutively align a single container for one day with the dispenser outlet and then, at a proper time advance the wheel to align another container for the next day. The times of day as well as the number of containers to be aligned with the dispenser opening will be suitably controlled by the programmable controller.

Figure 11:
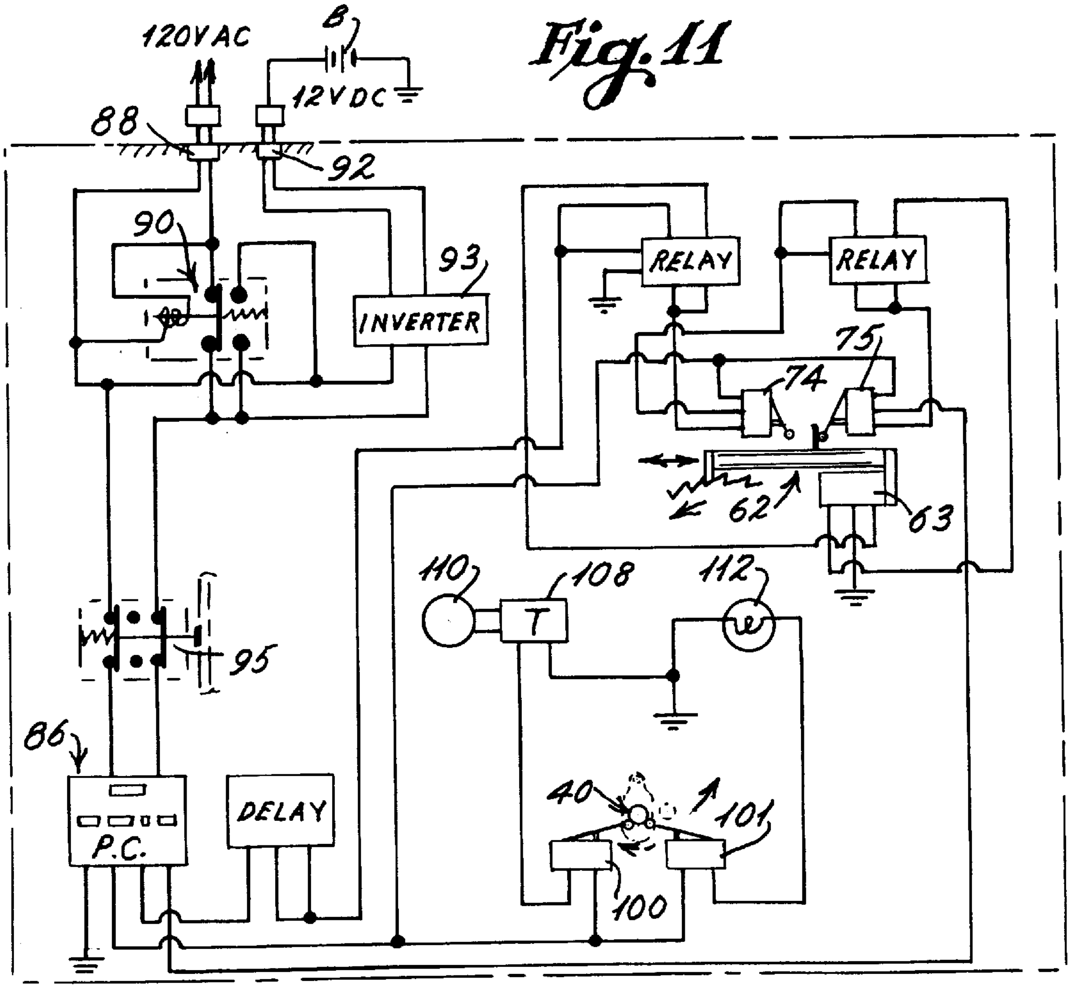
FIG. 11 is an electrical circuit diagram of the present invention.

The programmable controller and the motor receive power from a conventional source of power supply such as an AC circuit (not shown). To facilitate portability, an appropriate AC outlet socket 88 is provided through the rear wall 28 of the carrying case 21. As shown in FIG. 11, the outlet socket is connected through a normally closed relay switch 90 to the controller 86 and from the controller to the motor 63. In the event of power failure, the invention further incorporates a backup DC power input 92 for a battery "B". The battery may be mounted within the carrying case 21. The battery is connected through an inverter 93 to the relay switch 90. In the event of power failure, the normally closed relay switch will move to open the circuit between the programmable controller and the AC inlet socket and close a circuit between the inverter 93 and the programmable controller thus assuring no loss of power to the dispenser. As further shown in FIG. 11, a safety switch 95 is provided for terminating power to the motor and the programmable controller in the event the lid 23 is opened.

The present invention also provides both an audio as well as visual signal to the patient that medication in required. Mounted within the carrying case are a pair of spaced switches 100 and 101 each having switch contacts 102 and 103, respectively, which are engageable by pivot arms 104 and 105 having outer ends which are engageable with a container 40 being moved relative to the dispenser outlet opening 34, as shown in FIG. 4. Switch 100 is a normally open switch which is closed when a container 40 engages the pivot arm 104 to close the switch 102 as the container moves from a position adjacent to the dispenser outlet opening 34 into position aligned with the opening. During this movement the switch contact 102 is closed thereby closing a circuit shown in FIG. 11 to a buzzer 110. The buzzer will sound for the period of time that is necessary to move the container 40 from one position to the next. In some embodiments, a delay 108 may be included in the electrical circuit to allow the buzzer to sound for a predetermined period of time. As the container 40 comes into alignment with the dispenser outlet 34, the cover 35 is pivoted to an open position as previously described. However, the container, as shown in FIG. 5, engages the outer end of the arm 105 of the switch 101 thereby closing the switch contact 103 to supply power from the power source to a light source 112, as shown in FIG. 11. The light will remain illuminated until the container 40 aligned with the dispenser opening 34 is removed from the dispenser. After being removed, the spring loaded arm 101 will pivot outwardly opening the contact 103 and terminate power to the light source 112.

With specific reference to FIG. 5, to insure the proper operation of the switches 100 and 101 and to maintain the proper alignment of a medicine container 40 with the outlet 34, a biasing arm 115 is mounted so as to engage an opposite portion of the container 40 from the switches 100 and 101 when the container is moved into alignment with the dispenser outlet opening 34.

In use of the medication dispenser the present invention, a doctor, nurse or other qualified medical technician or, in some instances, a patient, family member or friend, will fill the sterilized containers with the predetermined medications which are to be taken by the patient. Any number of pills, capsules or other medications may be placed in a single container. The containers are then closed and are placed in appropriate pockets 50 within the ratchet wheel 52. The number of containers 40 utilized will depend on the patient's required medication. Thereafter, the programmable controller will be programmed to control when each of the containers will be brought into alignment with the dispenser outlet. Such programmed information will control the operation of the motor and the number of indexing steps at the appropriate times of day. As medication becomes due, the programmable controller will cause current to flow to the motor thereby activating the linear actuator and indexing the wheel one position. The number of indexing steps will depend upon the number of medications to be taken daily.

What is claimed is:

1. A medication dispenser for dispensing doses of medication to a patient on a predetermined schedule comprising;

a carrying case having a dispenser outlet opening therein, a generally planar wheel element mounted within said carrying case, a plurality of pockets formed in said wheel element adjacent a peripheral edge thereof in equally spaced relationship with respect to one another, indexing means mounted within said carrying case to rotate said wheel element so as to incrementally align said pockets relative to said dispenser outlet opening, a programmable controller mounted within said carrying case and electrically connected to said indexing means whereby said programmable controller controls an incremental movement of said wheel element based upon a predetermined time schedule, means for connecting said programmable controller to a source of electrical power, a plurality of medication containers adapted to be selectively positioned within said pockets of said wheel element for receiving doses of medication to be supplied to a patient on a predetermined schedule, said medication containers being of a size to be removable from said pockets through said dispenser outlet opening, a cover member pivotally moveable with respect to said carrying case from a first position covering said dispenser outlet opening to a second position in non-covering relationship to said dispenser outlet opening, means for moving said cover member from said first position to said second position in response to a medication container becoming aligned for removal through said dispenser outlet opening, and means for resiliently urging said cover member from said second position to said first position.

2. The medication dispenser of claim 1 including signaling means mounted within said carrying case for signaling when one of said medication containers which is seated within one of said pockets is aligned for removal from said carrying case through said dispenser outlet opening.

3. The medication dispenser of claim 2 in which said signaling means includes an audible element mounted within said carrying case, a first switch means mounted adjacent said dispenser outlet opening and electrically connected to said audible element, said first switch means including means for detecting the movement of said one of said medication containers into alignment with said dispenser outlet opening to thereby supply power to said audible element.

4. The medication dispenser of claim 3 in which said signaling means includes a visual indicator mounted to said carrying case, a second switch means electrically connected to said visual indicator, said second switch means being mounted adjacent said dispenser outlet opening and being operable to detect the presence of said one of said medication containers in alignment with said dispenser outlet opening to thereby supply power to said visual indicator.

5. The medication dispenser of claim 4 in which said wheel element includes plurality of ratchet teeth extending from said peripheral edge thereof, and said indexing means including a linear actuator assembly for engaging said ratchet teeth to incrementally rotate said wheel element within said carrying case.

6. The medication dispenser of claim 5 wherein said linear actuator assembly includes a reciprocating member driven by a motor, and a resiliently mounted element carried by said reciprocating member for engaging said ratchet teeth.

7. The medication dispenser of claim 6 including switch means mounted adjacent said reciprocating member for controlling said motor to create an oscillating movement of said reciprocating member.

8. The medication dispenser of claim 7 in which said reciprocating member includes a screw driven by said motor, and a movable cylinder driven by said screw.

9. The medication dispenser of claim 1 wherein said means for moving includes means engageable by one of said medication containers to urge said cover from said first position to said second position.

10. The medication dispenser of claim 1 including a storage area within said carrying case of a size to receive said medication containers after medication has been removed therefrom, and an opening in said carrying case aligned with said storage area through which said medication containers are inserted into said storage area.

11. The medication dispenser of claim 1 including at least forty-eight pockets in said wheel element.

12. The medication dispenser of claim 1 wherein said carrying case includes a lid and a covered portion, and means for locking said lid to said covered portion.

13. The medication dispenser of claim 1 in which said means for connecting said programmable timer to a source of electrical power includes an AC power input circuit and DC power circuit mounted within said carrying case, a switch means for connecting said DC power circuit to said AC power input circuit in the event of a failure of AC power to said AC power supply circuit.

14. A medication dispenser for dispensing doses of medication to a patient on a predetermined schedule comprising;

a carrying case having a dispenser outlet opening therein, a wheel element mounted within said carrying case, a plurality of pockets formed in said wheel element in equally spaced relationship with respect to one another, means mounted within said carrying case to rotate said wheel element so as to align said pockets relative to said dispenser outlet opening, a programmable controller mounted within said carrying case and electrically connected to said means to rotate said wheel element whereby said programmable controller controls movement of said wheel element based upon a predetermined time schedule, means for connecting said programmable controller to a source of electrical power, a plurality of medication containers adapted to be selectively positioned within said pockets of said wheel element for receiving doses of medication to be supplied to a patient on a predetermined schedule, and a cover mounted within said carrying case for selectively closing said dispenser outlet opening, resilient means for urging said cover to a closing relationship relative to said dispenser outlet opening, and said cover including means engageable by one of said medication containers to urge said cover from a closed position to an open position relative to said dispenser outlet opening.

15. The medication dispenser of claim 1 including signaling means mounted within said carrying case for signaling when one of said medication containers which is seated within one of said pockets is aligned for removal from said carrying case through said dispenser outlet opening.

16. The medication dispenser of claim 15 in which said signaling means includes an audible element mounted within said carrying case, a first switch means mounted adjacent said dispenser outlet opening and electrically connected to said audible element, said first switch means including means for detecting the movement of said one of said medication containers into alignment with said dispenser outlet opening to thereby supply power to said audible element.

17. The medication dispenser of claim 16 in which said signaling means includes a visual indicator mounted to said carrying case, a second switch means electrically connected to said visual indicator, said second switch means being mounted adjacent said dispenser outlet opening and being operable to detect the presence of said one of said medication containers in alignment with said dispenser outlet opening to thereby supply power to said visual indicator.

18. The medication dispenser of claim 14 including a storage area within said carrying case of a size to receive said medication containers after medication has been removed therefrom, and an opening in said carrying case aligned with said storage area through which said medication containers are inserted into said storage area.

19. The medication dispenser of claim 14 in which said means for connecting said programmable timer to a source of electrical power includes an AC power input circuit and DC power circuit mounted within said carrying case, a switch means for connecting said DC power circuit to said AC power input circuit in the event of a failure of AC power to said AC power supply circuit.

* * * * *